US009135537B2

(12) United States Patent
Sawada

(10) Patent No.: US 9,135,537 B2
(45) Date of Patent: Sep. 15, 2015

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Hideharu Sawada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/561,739

(22) Filed: Dec. 5, 2014

(65) Prior Publication Data

US 2015/0178604 A1 Jun. 25, 2015

(30) Foreign Application Priority Data

Dec. 24, 2013 (JP) ................................. 2013-265358

(51) Int. Cl.
*G06F 3/12* (2006.01)
*G06K 15/02* (2006.01)
*G06K 15/00* (2006.01)

(52) U.S. Cl.
CPC .................................. *G06K 15/1848* (2013.01)

(58) Field of Classification Search
CPC ......................... G06K 15/1848; G06F 3/1218
See application file for complete search history.

(56) References Cited

U.S. PATENT DOCUMENTS

2009/0168107 A1* 7/2009 Takeuchi et al. ............. 358/1.18
2011/0176172 A1* 7/2011 Nakata ......................... 358/1.15
2012/0154853 A1* 6/2012 Otake .......................... 358/1.15

FOREIGN PATENT DOCUMENTS

JP 2002-094762 3/2002

* cited by examiner

*Primary Examiner* — Dov Popovici
(74) *Attorney, Agent, or Firm* — Fitzpatrick, Cella, Harper & Scinto

(57) ABSTRACT

An object of the present invention is to provide an information processing apparatus capable of skipping printing of an appropriate margin area based on information on a header or footer at the time of performing printing. In the present invention, header/footer information including at least one of header information and footer information for a document, which is set to an application that creates the document, is acquired, and based on the acquired header/footer information, a margin area of the document is calculated. Then, a setting is performed to a printer driver capable of giving a printing apparatus instructions to perform printing by skipping printing of a margin area so that the printing apparatus skips printing of the margin area calculated in the calculation step.

13 Claims, 11 Drawing Sheets

INFORMATION PROCESSING APPARATUS, INFORMATION PROCESSING METHOD, AND MEDIUM

BACKGROUND OF THE INVENTION

1. Field of the Invention

The present invention relates to an information processing apparatus, an information processing method, and a medium. Specifically, the present invention relates to an information processing apparatus, an information processing method, and a medium related to plug-in software that is incorporated in a general-purpose application and which extends the function of the application in cooperation with a printer driver that controls a printing apparatus.

2. Description of the Related Art

There exists an application that has a function of header/footer printing for adding a page number or a title at the upper or lower end of a page so as to sandwich an image and text constituting the body of a document at the time of printing. For example, in the case of Microsoft Office Word (Microsoft Corporation), in the setting of header/footer printing, it is possible to specify the position of text input by a user and header/footer in addition to a page number and a title.

In the case where such header/footer printing is performed, the application attaches a header or footer at a predetermined position that is specified for the size of defined regular-size paper. Because of this, in the case where text or an image constituting the body of a document created by a user is small compared to the size of the defined regular-sized paper, a margin is produced between the body and a header or between the body and a footer (see FIG. 1).

In such circumstances, a technique is known, which makes it possible to save paper by deleting a margin not intended by a user in printing using roll paper. Japanese Patent Laid-Open No. 2002-94762 has disclosed that pixels of image data and pixels of a margin area are compared in order to determine a margin area that exists in print data, and thereby, the margin is deleted after the determination of the margin area.

SUMMARY OF THE INVENTION

However, in the above-described Japanese Patent Laid-Open No. 2002-94762, determination is performed based on the comparison of pixels, and therefore, there is a case where, for example, it is difficult to distinguish a margin between the header and the body or between the footer and the body set by the application from the white area within the body. Consequently, there is a possibility that even the white area arranged intentionally by a user in view of a design will be deleted at the time of performing printing to save paper by deleting the margin, resulting in a problem. The present invention has been made in view of this problem.

The present invention provides an information processing apparatus comprising: an acquisition unit configured to acquire header/footer information including at least one of header information and footer information for a document, which is set to an application that creates the document; a calculation unit configured to calculate a margin area of the document based on the header/footer information acquired by the acquisition unit; and a setting unit configured to perform a setting to a printer driver capable of giving a printing apparatus instructions to perform printing by skipping printing of a margin area so that the printing apparatus skips printing of a margin area calculated by the calculation unit.

Consequently, an object of the present invention is to provide an information processing apparatus capable of appropriately skipping printing of a margin area based on information on the header or footer at the time of performing printing.

Further features of the present invention will become apparent from the following description of exemplary embodiments (with reference to the attached drawings).

DESCRIPTION OF THE EMBODIMENTS

Hereinafter, best embodiments for embodying the present invention are explained by using the drawings.

(System Configuration)

Figure 1:
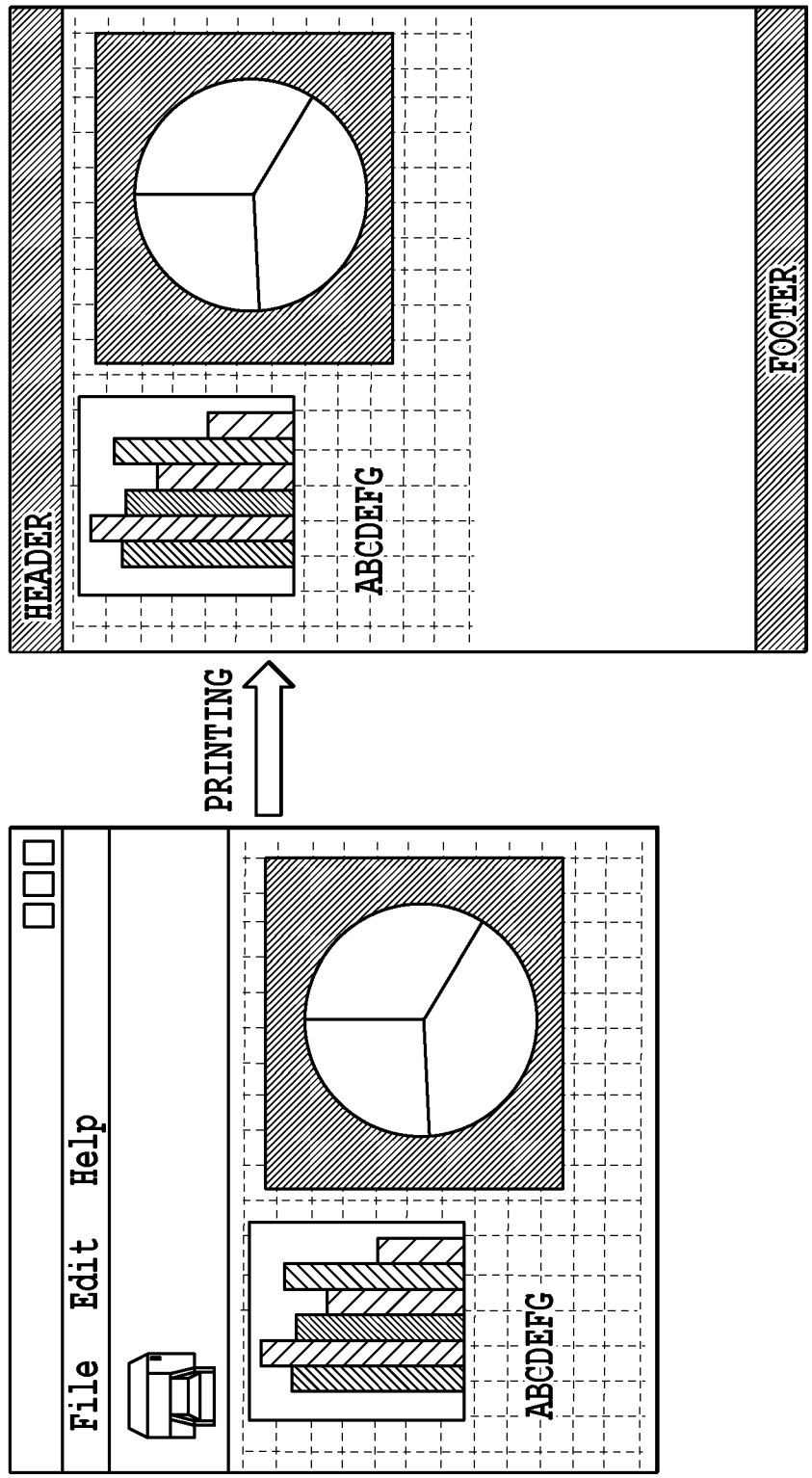
FIG. 1 is a diagram showing results of printing in which a margin is produced between the body and a footer.
Figure 2:
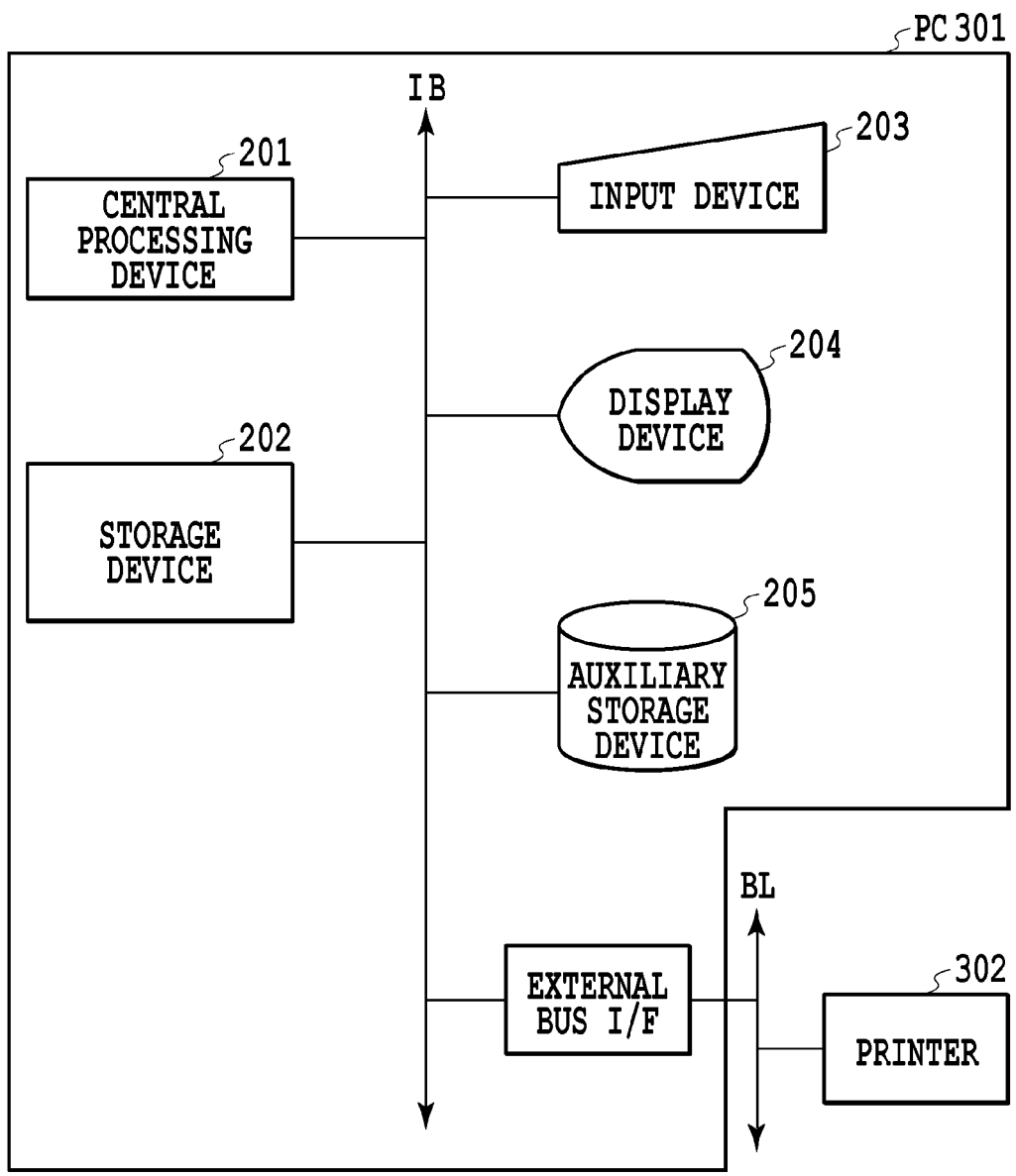
FIG. 2 is a block diagram showing a hardware structure of the inside of a PC having a plug-in, and a connection between the PC and the outside according to the present invention.

FIG. 2 is a block diagram showing an internal structure of a PC 301 and a connection between the PC 301 and an external printer 302. A system according to the present embodiment includes the PC 301 and the printer 302 represented by a large-sized printer.

The PC 301 is a general information processing apparatus. The PC 301 includes a central processing device 201 including a CPU, a storage device 202, such as a RAM, an input device 203, such as a mouse and a keyboard, a display device 204, such as a CRT and an LCD, and an auxiliary storage device 205, such as a hard disk and a magneto-optical disc. Theses components are connected to one another by an internal bus line IB The input device 203 is a device for a user to perform various kinds of input operations to an icon, a menu, and other objects displayed on a display device by an application or a plug-in. In the auxiliary storage device 205, a plug-in, an application, an operating system (abbreviated to OS in the present specification), other programs, etc., according to the present invention are stored and these are appropriately called by the central processing device 201 and stored in the storage device 202. Further, the internal bus line IB of the PC 301 is connected with the printer 302 via an external bus line BL and it is possible to transmit a print job from the PC 301 to the printer 302.

(Configuration of Software)

Figure 3:
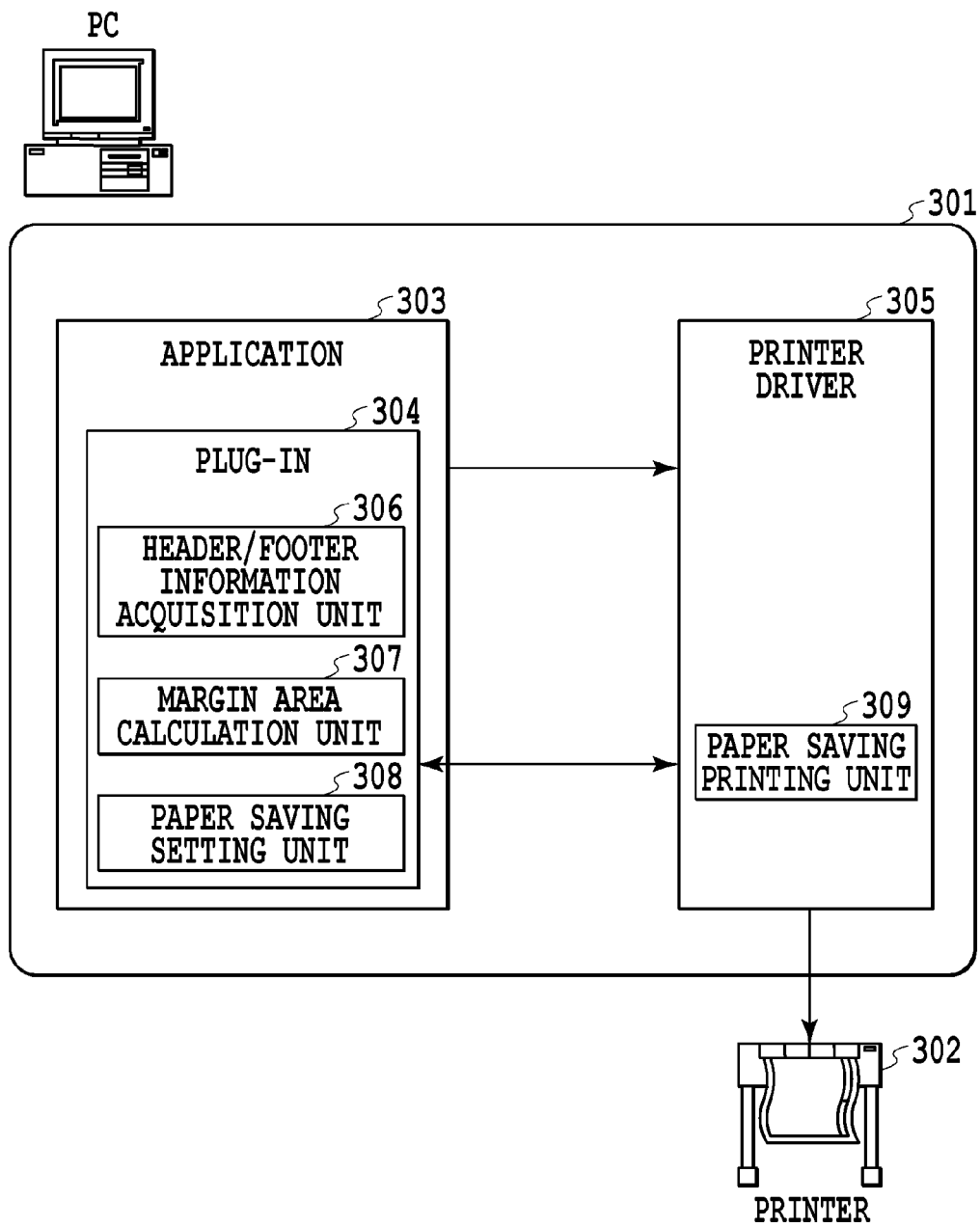
FIG. 3 is a block diagram showing a software outline configuration of a PC having a plug-in according to the present invention.

FIG. 3 is a software outline configuration diagram of the PC 301 having the plug-in according to the present embodiment. The PC 301 includes an application 303 and a printer driver 305.

The application 303 is an application that runs on the PC 301. In the following example, explanation is given by using Microsoft Excel as an example of a general-purpose application. Microsoft Excel is the application of Microsoft Corporation and as described previously, Microsoft Corporation has made public the units for incorporating an additional function. In the application 303, a plug-in 304 for adding a function has already been installed.

The plug-in 304 is an extension program for extending the function of the application and runs on the application 303. As will be described later, the plug-in 304 operates in cooperation with the printer driver 305 that controls the printer 302 in accordance with the setting of the application. The important technical features of the present invention are a header/footer information acquisition portion 306, a margin area calculation portion 307, and a paper saving setting portion 308, which are included in the plug-in 304.

The application 303 make a printing request to the printer driver 305 via the OS. The printer driver 305 interprets the printing command received via the OS, and generates print data that can be interpreted by the printer 302 and outputs the print data to the printer 302. Further, the printer driver 305 receives instructions to change the printing setting from the plug-in. The printer driver 305 according to the present invention includes a paper saving printing portion 309 configured to skip printing of a margin at the time of printing.

The plug-in acquires at least one of header information and footer information (in the present specification, abbreviated to "header/footer information") from the application by the header/footer information acquisition portion 306. The margin area calculation portion 307 calculates a margin area that can be deleted within the document by using the header/footer information acquired by the header/footer information acquisition portion 306. Further, the margin area calculation portion 307 converts the calculated margin area into a value that can be interpreted by the printer driver 305. The paper saving setting portion 308 performs the setting to delete a margin between the header and the body or between the footer and the body. In the case where the paper saving setting has been performed by the paper saving setting portion 308, the paper saving printing portion 309 controls the printer 302 so as to skip printing of a margin.

(Upper/Lower Margin Deleting Function)

Figure 4B:
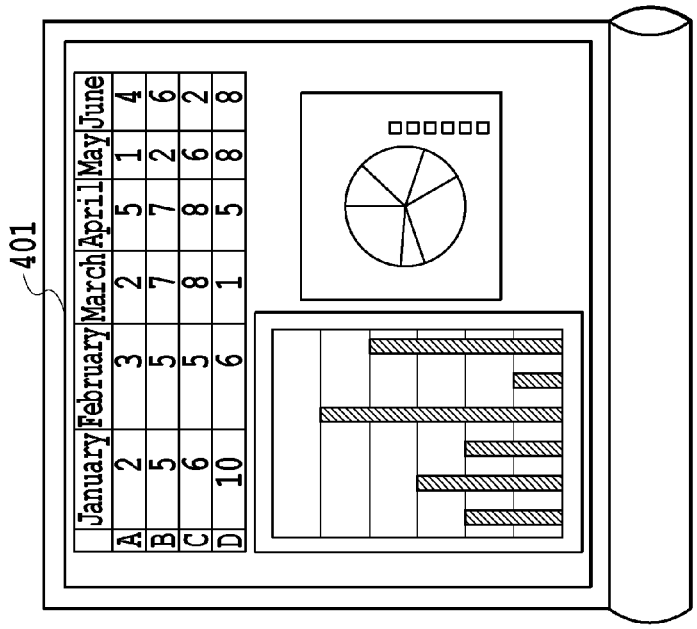
FIGS. 4A and 4B are explanatory diagrams of an upper/lower margin deleting function possessed by a printer.
Figure 4A:
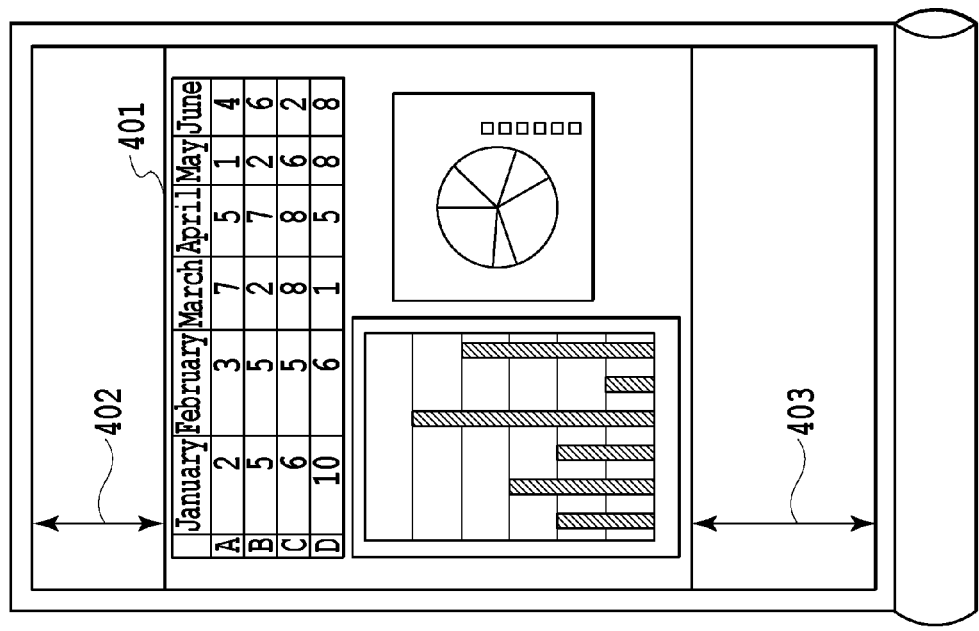

FIG. 4 is a diagram for explaining the function to delete an upper/lower margin possessed by the printer 302. The upper/lower margin deleting function is a function inherent in roll paper, which prints only image data the exists within a page in accordance with the instructions by the printing command from the printer driver 305 and which does not perform paper feed of the upper/lower margin portions. The upper/lower margin deleting function is used to save paper. FIG. 4A shows an example in the case where the upper/lower margin deleting function is not used. In FIG. 4A, at the upper and lower portions of image data portion 401, extra blanks 402 and 403 are produced. FIG. 4B shows an example in the case where the upper/lower margin deleting function is used. As shown in FIG. 4B, it is possible to obtain printed matter in which only image data is printed because paper feed is not performed for the extra blanks at the upper and lower portions of the image data portion 401 that exist in FIG. 4A.

In the present embodiment, explanation is given by using Microsoft Excel as an example of a general-purpose application as shown in FIGS. 4A and 4B, but the application is not limited to this. It is possible to apply the present invention to all applications having the extension units equivalent to those of Microsoft Excel.

(Explanation of Plug-in According to the Present Invention)

In the following, a plug-in according to the present invention is explained.

Figure 5:
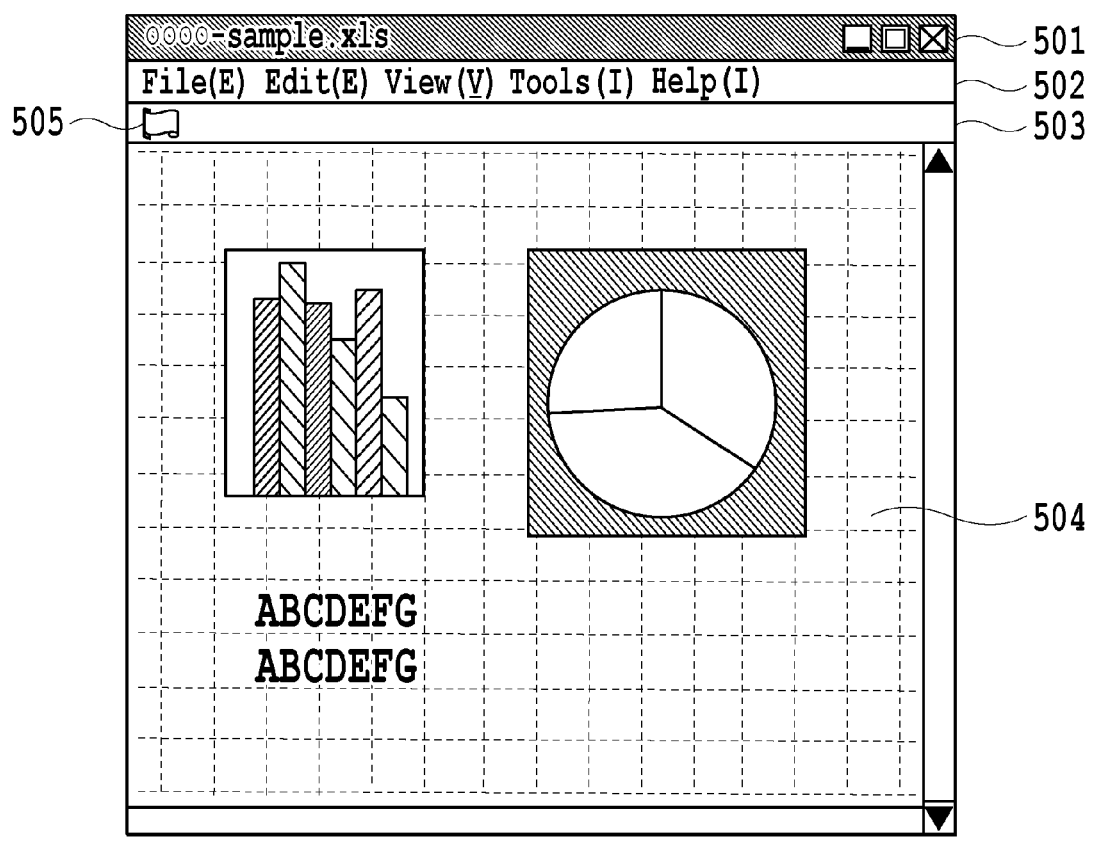
FIG. 5 is a diagram showing a screen at the time of activating an application.

First, the operation in the case where the plug-in 304 is registered in the application is explained. FIG. 5 shows a screen that is displayed on the display device 204 in the case where the application 303 in which the plug-in 304 is registered is started. The screen of the application includes a title bar 501 that displays the title of a document currently being created, the application name, etc., a menu bar 502 that displays the functions of the application in the form of a menu, and a document display area 504 where a document currently being created is displayed. Further, the screen of the application includes a tool bar 503 that displays the function added by the plug-in and the function that the application originally has by using an icon.

An icon 505 is a plug-in start icon that is displayed on the tool bar 503 of the application in the case where the plug-in according to the present invention is registered in the application. Here, explanation is given on the premise that the plug-in according to the present invention has already been registered in the application. The method for registering the plug-in in the application is publicly known, and therefore, explanation is omitted.

Figure 6:
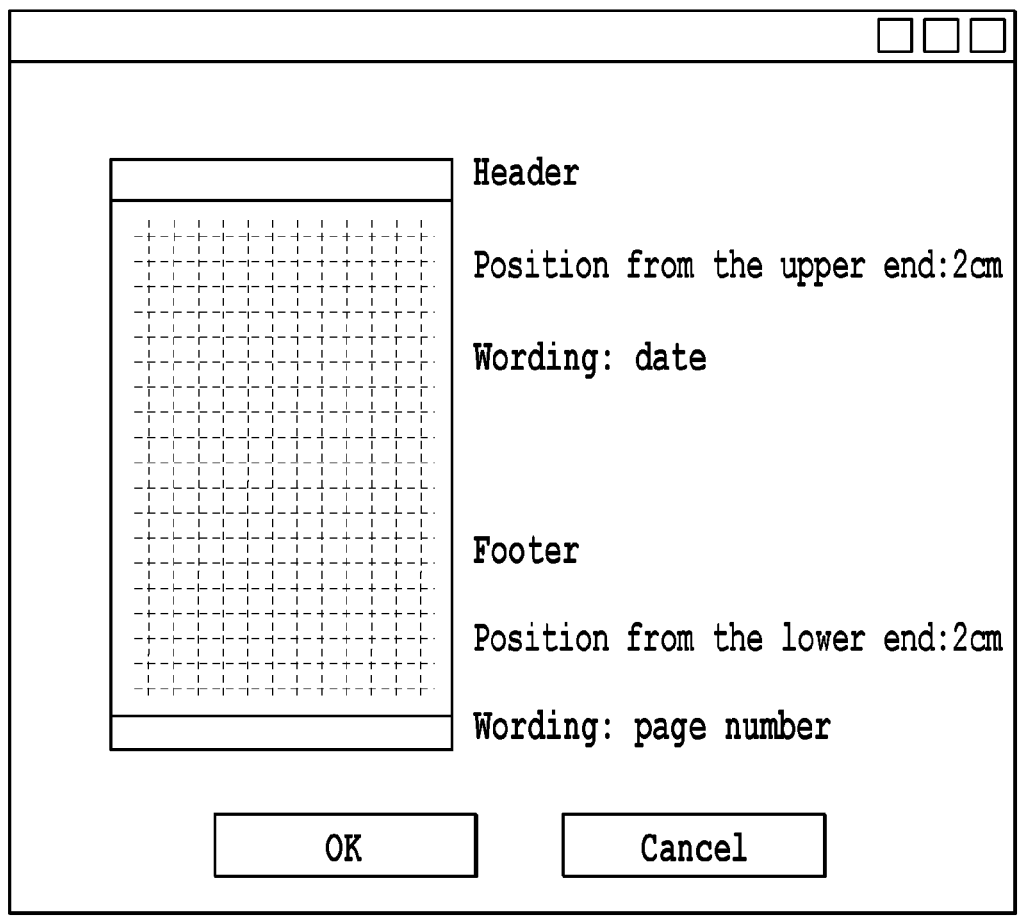
FIG. 6 is a diagram showing an example of a dialog displayed at the time of specifying a header or footer in the application.

FIG. 6 illustrates a dialog, which is the output of the function of the application, displayed at the time of performing the setting related to the header or footer. As the premise of the present embodiment, it is assumed that the setting to add the header or footer as illustrated in FIG. 6 has already been performed in the application.

In the following, a method for deleting the margin area between the header and the body or between the footer and the body by the cooperation of the plug-in according to the present invention and the driver is explained by using a flowchart in FIG. 7.

Figure 7:
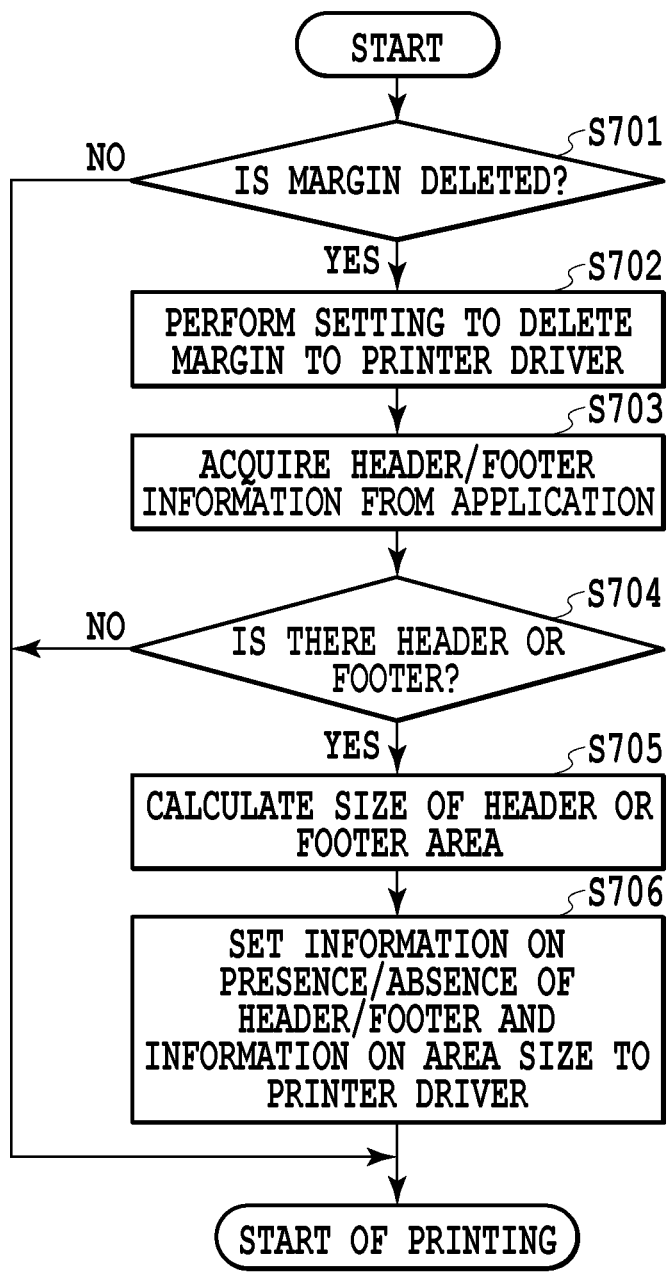
FIG. 7 is a flowchart showing a flow of a series of operations performed by the plug-in according to the present invention.

FIG. 7 is the flowchart that is started by the pressing-down of the icon 505 by a user as a trigger while the application 303 in which the plug-in 304 is registered is being performed, and which shows the operation to perform printing while deleting the margin area between the header and the body or between the footer and the body. The flowchart shown in FIG. 7 is implemented by the CPU of the central processing device 201 executing the program corresponding to the plug-in 304 stored within the ROM.

Figure 8:
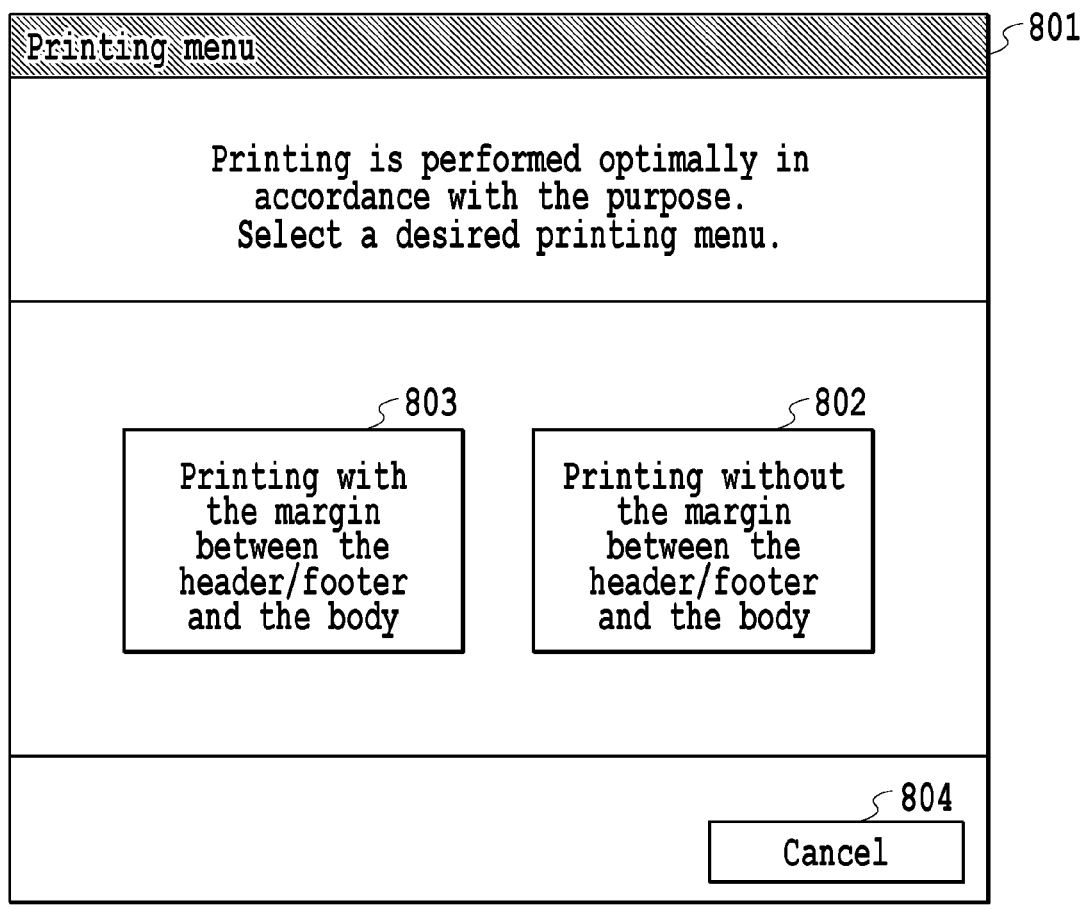
FIG. 8 is a diagram showing an example of a printing menu dialog at the time of activating the plug-in according to the present invention.
Figure 9:
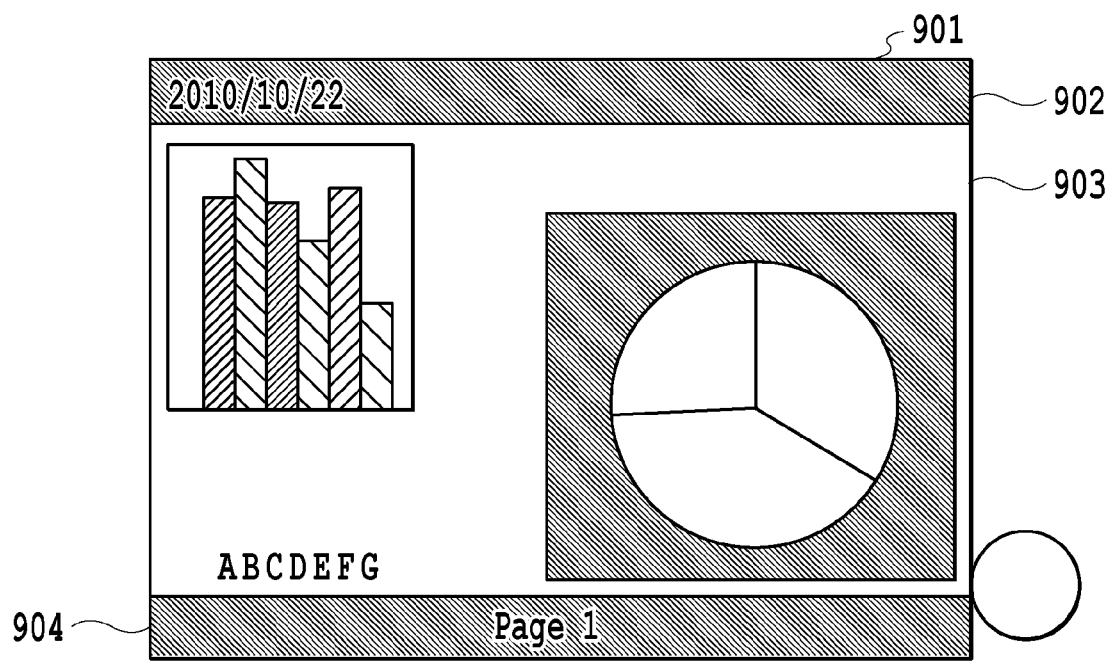
FIG. 9 is a diagram showing an image of printed matter in which margins between the header and the body and between the footer and the body have been deleted.

At step S701, the CPU of the central processing device 201 executes the program corresponding to the plug-in 304 and causes the display device 204 to display a printing menu dialog by the plug-in 304. FIG. 8 shows an example of the printing menu dialog. As illustrated in FIG. 8, a printing menu dialog 801 includes a menu on which it is possible for a user to select one of two printing methods for a spread sheet document currently being edited. A "Printing without the margin between the header/footer and the body" button 802 is a button to specify a menu for performing printing of the spread sheet document currently being edited into one page by deleting the margin between the header and the body or between the footer and the body. In the case where the button 802 is pressed down, the processing proceeds to step S702 in FIG. 7. A "Printing with the margin between the header/footer and the body" button 803 is a button to specify a menu for performing printing of the spread sheet document currently being edited into one page without deleting the margin between the header and the body or between the footer and the body. In the case where the button 803 is pressed down, the setting related to the margin existing between the header and the body or between the footer and the body (setting in the case where there is a margin) is performed for the printer driver 305, and the printing is started after exiting the processing of the flowchart in FIG. 7. In the case where a "Cancel" button 804 is pressed down by a user, the printing menu dialog 801 is exited and the operation of the plug-in is exited. In the present embodiment, the operation in the case where the button 802 is pressed down is explained in detail. FIG. 9 illustrates an image 901 of printed matter that is output on roll paper included in the printer 302 as the result of a user pressing down the button 802 of the printing menu dialog 801. By performing printing through the plug-in 304 according to the present invention and the printer driver 305, it is possible to perform printing by deleting the margin not intended by a user in the case where the setting of the header or footer has been performed in the application. In the example in FIG. 9, no margin exists between a header area 902 and an area 903 in which spread sheet data exists and between a footer area 904 and the area 903 in which the spread sheet data exists, and printing is performed so that the printout is included in one page.

Returning to the flowchart in FIG. 7 and explanation is given.

At step S702, the CPU of the central processing device 201 performs the setting to delete the margin to the printer driver 305 by executing the program corresponding to the paper saving setting portion 308. Next, the processing proceeds to step S703.

At step S703, the CPU of the central processing device 201 acquires the header/footer information that is set to the document currently being edited by executing the program corresponding to the header/footer information acquisition portion 306. The header/footer information of the application as illustrated in FIG. 6 is acquired by the header/footer information acquisition portion 306. The header/footer information of the application in the present embodiment includes information on the header start position, information on the wording set as the header, information on the footer start position, information on the wording set as the footer, etc. Next, the processing proceeds to step S704.

At step S704, the CPU of the central processing device 201 determines whether the header or footer is included in the document currently being edited based on the header/footer information acquired from the application by using the plug-in 304. In the case where it is determined that the setting of the header or footer has not been performed in the application and the header or footer does not exist, the processing of the flowchart in FIG. 7 is exited and printing is started. In the case where it is determined that the setting of the header or footer has been performed in the application and the header or footer exists, the processing proceeds to step S705.

At step S705, the CPU of the central processing device 201 calculates the size of the header/footer area based on the header/footer information acquired at step S703 by using the plug-in 304. Specifically, the size of the header area is calculated based on the information on the header start position and the information on the wording set as the header. Similarly, the size of the footer area is calculated based on the information on the footer start position and the information on the wording set as the footer. Next, the processing proceeds to step S706.

At step S706, the CPU of the central processing device 201 performs settings by sending the information on the presence/absence of the header/footer determined at step S704 and the information on the header footer area calculated at step S705 (specifically, size information) to the printer driver 305. Subsequently, instructions to start printing are transmitted to the printer driver 305 from the application 303. Further, the application 303 transmits print data to the printer driver 305. The processing by the plug-in 304 is completed here and the processing by the printer driver 305 is performed continuously (see FIG. 11).

Figure 10:
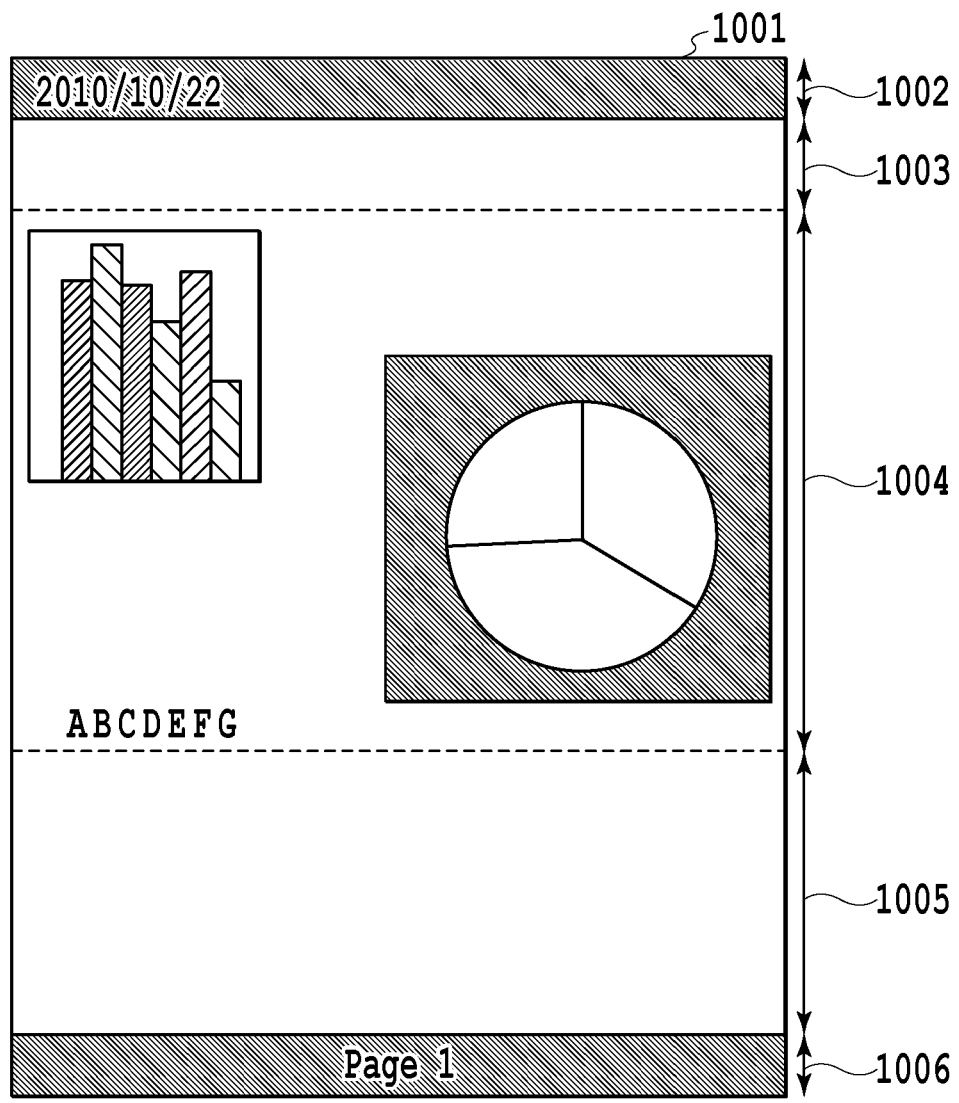
FIG. 10 is a diagram showing an image expressed by print data corresponding to one page generated by a printer driver.

FIG. 10 shows an image 1001 represented by print data corresponding to one page generated by printer driver 305 having received the instructions to start printing from the application by receiving data of a document from the application. The image 1001 includes a header area 1002, a margin area 1003 between the header area and a body area, a body area 1004, a margin area 1005 between the body area and the footer area, and a footer area 1006.

Figure 11:
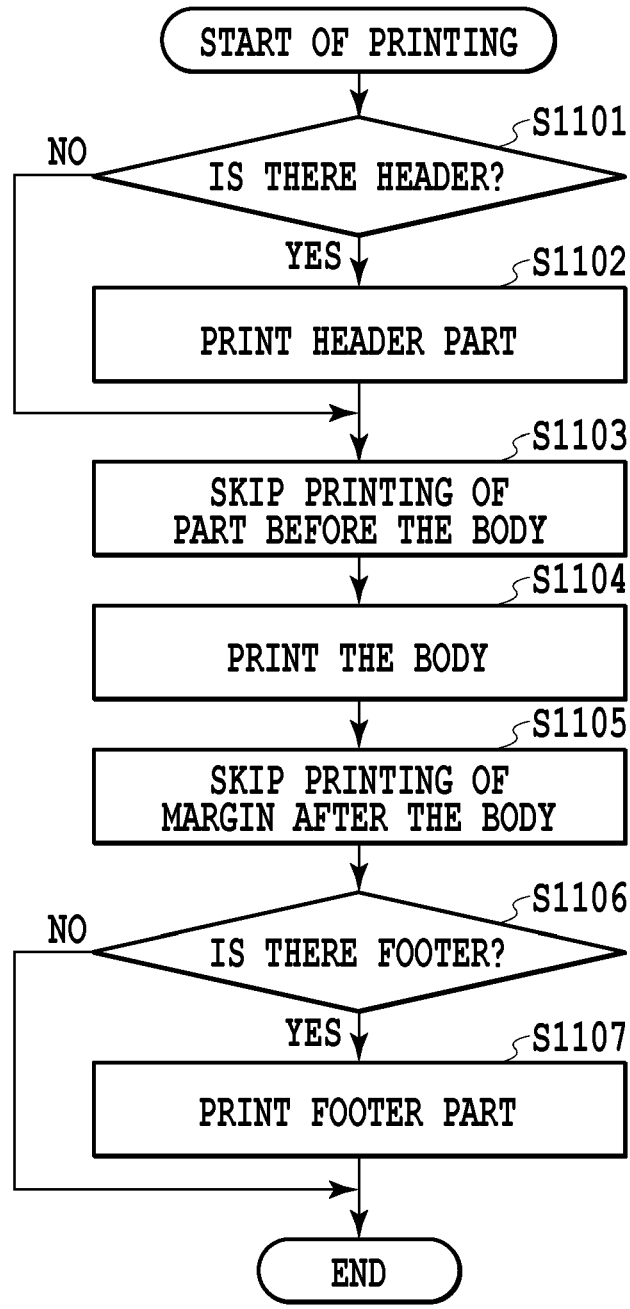
FIG. 11 is a flowchart showing a flow of a series of operations performed by the printer driver according to the present invention.

FIG. 11 is a flowchart showing a flow of processing performed by the printer driver 305 having received the instructions to start printing from the plug-in 304 after the above-described processing in FIG. 7. The flowchart in FIG. 11 is implemented by the CPU executing the program corresponding to the printer driver 305 having been given the instructions to start printing by the CPU using the plug-in 304.

First, at step S1101, the CPU of the central processing device 201 determines whether the header is set to the document by referring to the information set to the printer driver 305. In the case where it is determined that the header is set to the document, the processing proceeds to step S1102 and in the case where it is determined that the header is not set to the document, the processing proceeds to step S1103.

At step S1102, the CPU of the central processing device 201 gives the printer 302 instructions to print and output the header part of the document by the printer driver 305. Next, the processing proceeds to step S1103.

At step S1103, the CPU gives the printer 302 instructions to skip printing of the margin area 1003 between the header area and the body area as illustrated in FIG. 10 by the paper saving printing portion 309. Next, the processing proceeds to step S1104.

At step S1104, the CPU of the central processing device 201 gives the printer 302 instructions to perform printing of the body by the printer driver 305. Specifically, the central processing device 201 gives the printer 302 instructions to perform printing of the body area 1004 as illustrated in FIG. 10. By performing the processing at steps S1101 to S1104, it is made possible to perform printing so as to delete the margin area 1003 between the header and the body. Next, the processing proceeds to step S1105.

At step S1105, the CPU gives the printer 302 instructions to skip printing of the margin area 1005 between the body area and the footer area by the paper saving printing portion 309. Next, the processing proceeds to step S1106.

At step S1106, the CPU of the central processing device 201 determines whether the footer is set to the document by referring to the information set to the printer driver 305. In the case where it is determined that the footer is set to the document, the processing proceeds to step S1107 and in the case where it is determined that the footer is not set to the document, the processing is exited.

At step S1107, the CPU of the central processing device 201 gives the printer 302 instructions to print and output the footer part of the document by the printer driver 305.

As described above, by the present invention, it is possible to obtain printed matter as illustrated in FIG. 9 from which the margin not intended by a user between the body and the header or between the body and the footer has been deleted in the case where the header or footer is set in the application.

In other words, by referring to the header or footer setting of the application, the amount of margin that is deleted from the printing medium is determined in accordance with the setting, and therefore, it is possible to appropriately delete the margin corresponding to the header or footer. Further, it is possible to appropriately determine the header or footer area, and therefore, it is possible to prevent the printing of the blank area in the body, which is different from the margin between the header and the body or between the footer and the body, from being skipped.

In the embodiments described above, the processing, such as acquisition of the header or footer setting in the application, determination of the size thereof, and notification to the printer driver of the size information on the header or footer area, is performed by the plug-in software. However, the execution of the processing is not limited to the plug-in software and it may also be possible for the application itself to include the function of the above-described plug-in software. In this case, the application itself acquires the header or footer setting, determines the size thereof, and makes a notification to the printer driver.

Further, not limited to the case where the margin to be deleted is set to both the header and the footer, there may a case where the margin(s) of the header and/or footer is the target of deletion and the application acquires the header and/or footer setting(s).

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265358, filed Dec. 24, 2013, which is hereby incorporated by reference wherein in its entirety.

What is claimed is:

1. An information processing apparatus comprising:
an acquisition unit configured to acquire header/footer information including at least one of header information and footer information for a document, which is set to an application that creates the document;
a calculation unit configured to calculate a margin area of the document based on the header/footer information acquired by the acquisition unit; and
a setting unit configured to perform a setting for skipping printing of the margin area so that a printing apparatus skips printing of the margin area calculated by the calculation unit.

2. The information processing apparatus according to claim 1, wherein
the header/footer information includes information on a header start position, information on wording set as a header, information on a footer start position, and information on wording set as a footer.

3. The information processing apparatus according to claim 1, wherein
the margin area of the document is a margin area between a header and a body or a margin area between a body and a footer.

4. The information processing apparatus according to claim 1, wherein
the setting unit performs the setting so that printing of a blank area in a body, which is different from the margin area, is not skipped based on the margin area calculated by the calculation unit.

5. The information processing apparatus according to claim 1, comprising the application.

6. The information processing apparatus according to claim 1, the setting unit perform the setting to a printer driver capable of giving the printing apparatus an instruction to perform printing by skipping printing of the margin area.

7. The information processing apparatus according to claim 6, comprising the printer driver, wherein
the printer driver gives the printing apparatus instructions to perform printing in accordance with the setting by the setting unit.

8. An information processing method comprising:
an acquisition step of acquiring header/footer information including at least one of header information and footer information for a document, which is set to an application that creates the document;
a calculation step of calculating a margin area of the document based on the header/footer information acquired in the acquisition step; and
a setting step of performing a setting for skipping printing of the margin area so that a printing apparatus skips printing of the margin area calculated in the calculation step.

9. The information processing method according to claim 8, wherein
the header/footer information includes information on a header start position, information on wording set as a header, information on a footer start position, and information on wording set as a footer.

10. The information processing method according to claim 9, wherein
the margin area of the document is a margin area between a header and a body or a margin area between a body and a footer.

11. The information processing method according to claim 8, wherein
   in the setting step, the setting is performed so that printing of a blank area in a body, which is different from the margin area, is not skipped based on the margin area calculated in the calculation step.

12. A non-transitory computer readable storage medium storing a program for causing a computer to perform the information processing method according to claim 8.

13. A non-transitory computer readable storage medium according to claim 12, wherein
   the program is a plug-in program for extending a function of the application.

\* \* \* \* \*